(12) United States Patent
Shingleton et al.

(10) Patent No.: US 7,888,587 B2
(45) Date of Patent: *Feb. 15, 2011

(54) MODULAR SHADE SYSTEM WITH SOLAR TRACKING PANELS

(75) Inventors: Jefferson G. Shingleton, Auburn, NY (US); Thomas L. Dinwoodie, Piedmont, CA (US); Gianluigi Mascolo, Emeryville, CA (US)

(73) Assignee: SunPower Corporation, Systems, Richmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/470,876

(22) Filed: May 22, 2009

(65) Prior Publication Data

US 2009/0223142 A1    Sep. 10, 2009

Related U.S. Application Data (63) Continuation of application No. 10/796,582, filed on Mar. 9, 2004, now Pat. No. 7,557,292.

(60) Provisional application No. 60/453,637, filed on Mar. 10, 2003, provisional application No. 60/517,574, filed on Nov. 5, 2003.

(51) Int. Cl.
*E04B 7/02* (2006.01)
*H02N 6/00* (2006.01)
*H01L 25/00* (2006.01)

(52) U.S. Cl. .................. 136/246; 136/244; 126/600; 126/605; 126/608

(58) Field of Classification Search ............... 136/246, 136/244; 126/600, 605, 608
See application file for complete search history.

(56) References Cited

U.S. PATENT DOCUMENTS

| | | | |
|---|---|---|---|
| 4,000,734 | A | 1/1977 | Matlock et al. |
| 4,103,672 | A | 8/1978 | Meyer |
| 4,106,952 | A | 8/1978 | Kravitz |
| 4,138,994 | A | 2/1979 | Shipley, Jr. |
| 4,153,813 | A | 5/1979 | Blieden et al. |
| 4,159,710 | A | 7/1979 | Prast |

(Continued)

FOREIGN PATENT DOCUMENTS

AU    520336    1/1982

(Continued)

*Primary Examiner*—Alexa D Neckel
*Assistant Examiner*—Golam Mowla
(74) *Attorney, Agent, or Firm*—James F. Hann; Haynes Beffel & Wolfeld LLP (57) ABSTRACT

A modular shade system with solar tracking panels includes a series of generally North-South oriented, spaced apart torque tubes, each torque tube having an axis, a series of panels mounted to at least some of the torque tubes to create spaced-apart rows of panels along the torque tubes, at least some of the panels being solar collector panels. The system also includes a shade structure, positioned at a selected location between selected ones of the torque tubes and above the support surface so to provide an enhanced shaded region thereunder, and a support structure. The support structure includes a first mounting assembly mounting each torque tube above the support surface for rotation about the axis of each torque tube and a second mounting assembly supporting the shade structure at the selected location. The system further comprises a tilting assembly selectively rotating each torque tube about its axis.

24 Claims, 5 Drawing Sheets

U.S. PATENT DOCUMENTS

| | | |
|---|---|---|
| 4,173,213 A | 11/1979 | Kelly |
| 4,184,482 A | 1/1980 | Cohen |
| 4,187,123 A | 2/1980 | Diggs |
| 4,316,448 A | 2/1982 | Dodge |
| 4,345,582 A | 8/1982 | Aharon |
| 4,365,617 A | 12/1982 | Bugash et al. |
| 4,370,974 A | 2/1983 | Maxey |
| 4,404,465 A | 9/1983 | Miller |
| 4,429,178 A | 1/1984 | Prideaux et al. |
| 4,585,318 A | 4/1986 | Seifert |
| 4,611,090 A | 9/1986 | Catella et al. |
| 4,644,933 A | 2/1987 | Gregory |
| 4,663,495 A | 5/1987 | Berman et al. |
| 4,771,764 A | 9/1988 | Cluff |
| 4,832,001 A | 5/1989 | Baer |
| 4,966,311 A | 10/1990 | Taylor |
| 4,995,377 A | 2/1991 | Eiden |
| 5,131,955 A | 7/1992 | Stern et al. |
| 5,228,924 A | 7/1993 | Barker et al. |
| 5,253,637 A | 10/1993 | Maiden |
| 5,505,788 A | 4/1996 | Dinwoodie |
| 5,542,409 A | 8/1996 | Sampayo |
| 5,730,117 A | 3/1998 | Berger |
| 5,776,262 A | 7/1998 | Melchior |
| 6,058,930 A | 5/2000 | Shingleton |
| 6,341,451 B1 | 1/2002 | Morton, Sr. |
| 6,345,580 B1 | 2/2002 | Klintworth |
| 6,367,573 B1 | 4/2002 | Scott |
| 6,399,874 B1 | 6/2002 | Olah |
| 6,415,557 B1 | 7/2002 | McCalley |
| 6,489,552 B2 | 12/2002 | Yamawaki et al. |
| 6,606,823 B1 | 8/2003 | McDonough et al. |
| 6,702,370 B2 | 3/2004 | Shugar et al. |
| 6,722,357 B2 | 4/2004 | Shingleton |
| 7,069,704 B2 | 7/2006 | Pendley |
| 7,099,169 B2 | 8/2006 | West et al. |
| 7,557,292 B2 | 7/2009 | Shingleton et al. |
| 2001/0036024 A1 | 11/2001 | Wood |
| 2003/0070705 A1 | 4/2003 | Hayden et al. |

FOREIGN PATENT DOCUMENTS

| | | |
|---|---|---|
| DE | 386264 | 12/1923 |
| DE | 9013951 | 5/1991 |
| FR | 2608741 | 6/1988 |
| GB | 733010 | 7/1955 |
| GB | 2357785 | 7/2001 |
| JP | 56118021 | 9/1981 |
| JP | 59231362 | 12/1984 |
| JP | 6139585 | 5/1994 |
| JP | 10002063 | 1/1998 |
| JP | 11340491 | 12/1999 |
| WO | 0031477 | 6/2000 |
| WO | 0155651 | 8/2001 |

MODULAR SHADE SYSTEM WITH SOLAR TRACKING PANELS

CROSS-REFERENCE TO OTHER APPLICATIONS

This application is a continuation of U.S. patent application Ser. No. 10/796,582 filed on 9 Mar. 2004, which claims the benefit of U.S. provisional patent application No. 60/453,637 filed on 10 Mar. 2003 and U.S. provisional patent application No. 60/517,574 filed on 5 Nov. 2003; which applications are incorporated by reference as if fully set forth herein.

This application is related to U.S. design patent application No. 29/177,528 filed on 10 Mar. 2003, now U.S. Pat. No. D 511,576. This application is also related to U.S. patent application Ser. No. 10/796,299 filed on 9 Mar. 2004, entitled Modular Shade System.

BACKGROUND OF THE INVENTION

To improve the quality and economic value of outdoor spaces, it is desirable to develop means to provide low-cost, multi-use structures, to facilitate such things as mounting for electricity generating PV modules, shade for cars, shade for outdoor activities, agriculture, aquaculture, and to promote other purposes and events. Ancillary advantages from green roofs, also called vegetative roof coverings or eco-roofs, include controlling water runoff and reducing subsequent water pollution from buildings, parking lots and other structures.

In addition, the economic feasibility of photovoltaic (PV) power systems and the need for distributed power generation at the point of use has lead to an increasing world market for grid-connected PV systems. Many times in areas where PV is most economically attractive, open land for PV installation is scarce or nonexistent. There is, therefore, a need to incorporate PV power generating systems in urban areas where land is not readily available. Target areas include parking lots, roadways, parks, campuses, watersheds, reservoirs, canals, open areas adjacent to buildings, and other open areas.

BRIEF SUMMARY OF THE INVENTION

The present invention is directed to a modular shade system with solar tracking panels comprising a support surface, a series of generally North-South oriented, spaced apart torque tubes, each torque tube having an axis, a series of panels mounted to at least some of the torque tubes to create spaced-apart rows of panels along said torque tubes, at least some of the panels being solar collector panels. The system also includes a shade structure, positioned at a selected location between selected ones of the torque tubes and above the support surface so to provide an enhanced shaded region thereunder, and a support structure. The support structure includes a first mounting assembly mounting each torque tube above the support surface for rotation about the axis of each said torque tube and a second mounting assembly supporting the shade structure at the selected location. The system further comprises a tilting assembly selectively rotating each torque tube about its axis.

Various features and advantages of the invention will appear from the following description in which the preferred embodiments have been set forth in detail in conjunction with the accompanying drawings.

DESCRIPTION OF THE SPECIFIC EMBODIMENTS

FIGS. 1-5 illustrate the basic components of shade system 10. Shade system 10 comprises a support structure 12, shown best in FIGS. 3 and 4, to which an array of modular panels 14 are mounted. In one embodiment the center row 16 of modular panels 14 are tinted, transparent panels 18 provided to create an illuminated walkway along the length of shade system 10. The tinting of transparent panels 18, such as red, also provides a distinctive, aesthetically pleasing aspect to the shade system. In this embodiment the remainder of modular panels 14 are PV panels 20 so that shade system also acts as a source of electricity. Electricity could be used for a variety of purposes including charging batteries, creating hydrogen from water, or after being transformed into alternating current, fed into the commercial electrical grid. The modular panels 14 could also include to other types of modular structures such as planter modules used for growing plants on the top of shade system 10, skylight panels, mounting modules for supporting structures such as flags, antennas and cellular repeaters. The modular panels 14 could also be phosphorescent to provide passive nighttime illumination. In addition, modular panels 14 could be illuminated panels for active nighttime illumination beneath shade system 10.

Modular panels 14 may include a number of different structures, including the following: water collection containers; space cooling elements comprising at least one of spray misters for evaporative cooling, fans, pumps, wetted canvas, water storage containers, tubing, and evaporative spouts and elements for water collection and drainage. Modular panels 14 may also include modular features for multi-functionality and customization such as: acoustical control panels, seating elements, planting elements, playground elements, restroom elements, signage elements, antennae modules, payment machines, stage elements, rail transportation elements, fuel cell charging systems, hydrogen production devices, hydrogen storage devices, inverters for converting dc to ac electricity, electrical wireways, and elements which facilitate roller skating, ice skating, car shows, horse riding, housing the homeless, farmers markets, soccer matches, tennis matches, concerts, lightshows, fitness, and transportation nodes.

Support structure 12 includes a series of parallel purlins 22 mounted to and supported by transverse beams 24, the beams being supported by vertical columns 26. Purlins 22, in this embodiment, have holes 28 formed therein to facilitate mounting of panels 14. Support structure 12 is preferably designed to orient modular panels 14 at an angle 30 to enhance solar power efficiency and resistance to wind uplift, typically a 1-12 slope or 4.76 degrees.

Figures 1, 3:
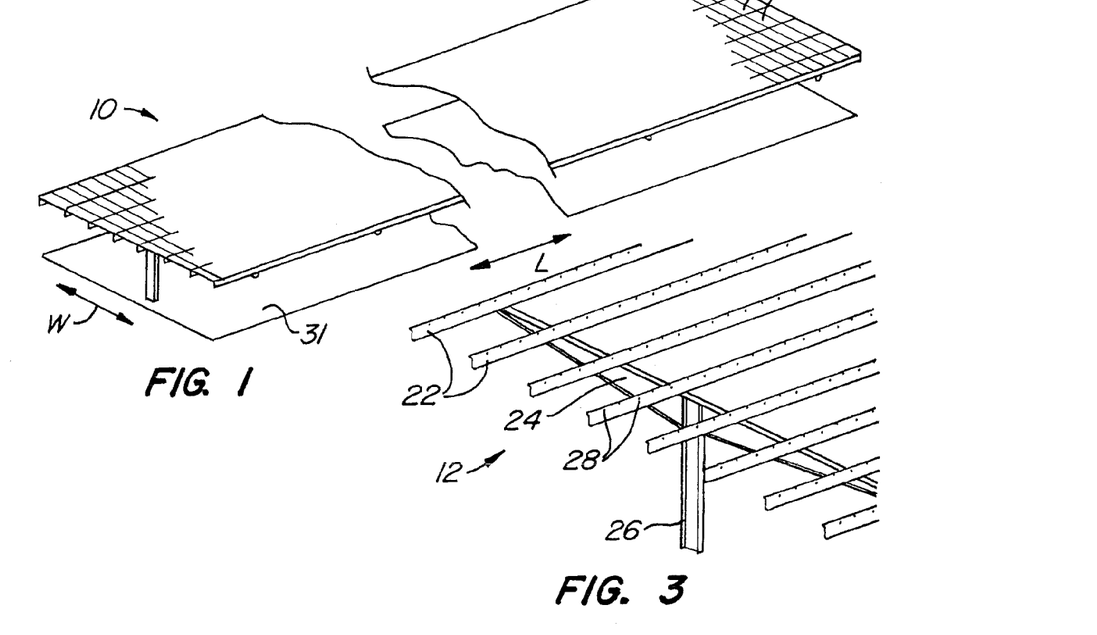
FIG. 1 is a top, a front, left side isometric view of a shade system made according to the invention in which the top of the system is covered by an array of modular panels.
FIG. 3 illustrates the structure of FIG. 2 with the modular panels removed leaving the support structure, including purlins, transverse beams supporting the purlins and columns supporting the beams.
Figure 2:
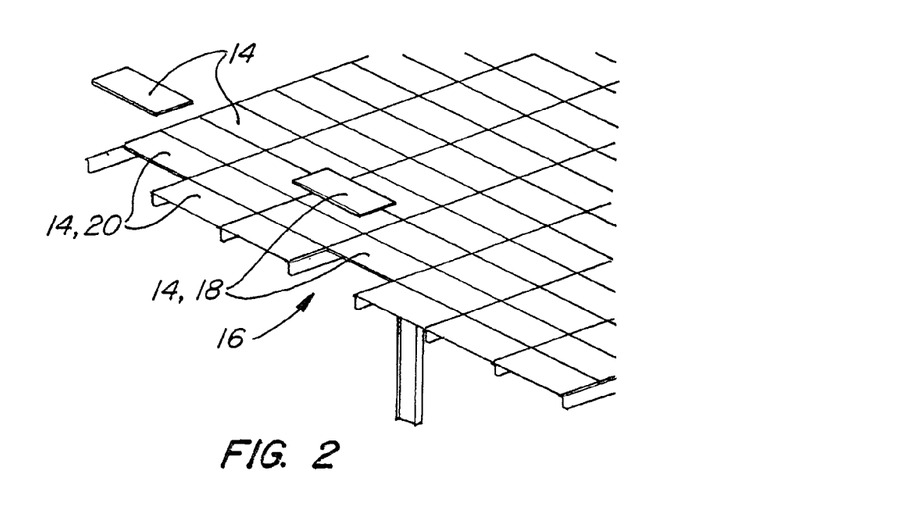
FIG. 2 is an enlarged view of a portion of FIG. 1 illustrating two different modular panels, that is a PV panel and a tinted transparent panel, spaced apart from the support structure.

Purlins 22 define a first shading area 31; see FIG. 1, vertically beneath the purlins. Area 31 has a length L and a width W. PV panels 20 and transparent panels 18 preferably cover at least about 90% of first shading area 31. In the embodiment of FIG. 1, 100% of first shading area 31 is covered by transparent panels 18 and PV panels 20. Transparent panels 18, or other light-transmissive panels, may cover about 0-50% of first shading area 31, and preferably about 5-30% of the first shading area.

When modular panels 14 are PV panels 20, a protective panel 32 is preferably used to cover the lower surface 34 of the PV panel. This helps prevent against both vandalism and inadvertent damage to the PV panels. Protective panel 32 is, in this embodiment, convex when viewed from below. The convex design provides high-strength with relatively thin material. Also, protective panel 32 is perforated, such as to the use of a perforated plastic material or a metal mesh, or is otherwise designed to provide ventilation for PV panel 20. In addition, when PV panel 20 is of the type that allows an amount, typically a small amount, of light to pass therethrough, making protective panel 32 light-transmissive, such as providing perforations or making the panel of light transmitting material, helps to illuminate the region beneath shade system 10. Protective panels 32 may be made of, for example, at least one of wire mesh, sheet metal, perforated sheet metal, plastic, perforated plastic, cement board, perforated cement board, and phosphorescent material. Protective panels 32 may also be used when PV panels 20 are used in other installations and not part of a shade structure, such as when PV panel 20 is used with a skylight in a building roof.

The subject invention constitutes a unique structure suitable for carports, pavilions, and other appropriate situations. The invention be used at gathering places for education, music concerts, farmers' markets, shaded parking/walkways. Shaded parking increases the life of the car's finish and reduces $CO_2$ emissions from the car components breaking down in UV. Also, shaded parking keeps cars cooler and more comfortable. Clean, renewable electricity can be created incorporating multiple PV panels 20; PV panels 20 can be mountable at an optimal angle for both electrical and wind performance. Shade system 10 is suitable for many functional uses and the modularity and flexibility of the design allows significant customization to fit the needs of many different situations. Special elements allow natural lighting of walkways and resistance to breakage by vandalism. The invention provides several possibilities: potential H2 fuel station; potential fuel cell distributed generation port; potential use as a greenhouse or nursery for plant cultivation; potential used as a platform for tracking photovoltaic systems.

The above disclosed embodiments disclose the use of conventional PV panels 20. If desired, PV panels 20 could be of the light concentrator type. Light concentrator types of PV panels 40, see FIG. 6, typically have an array of lenses 42 or other light concentrators positioned above the PV substrate 44 so to increase the intensity of the light received by the PV substrate. This permits the percentage of the active, electricity-generating area 46 of the PV substrate to be reduced when compared with non-light-concentrator types of PV substrates. This helps to make using more efficient electricity-generating materials on the PV substrate more cost-effective.

Figure 5:
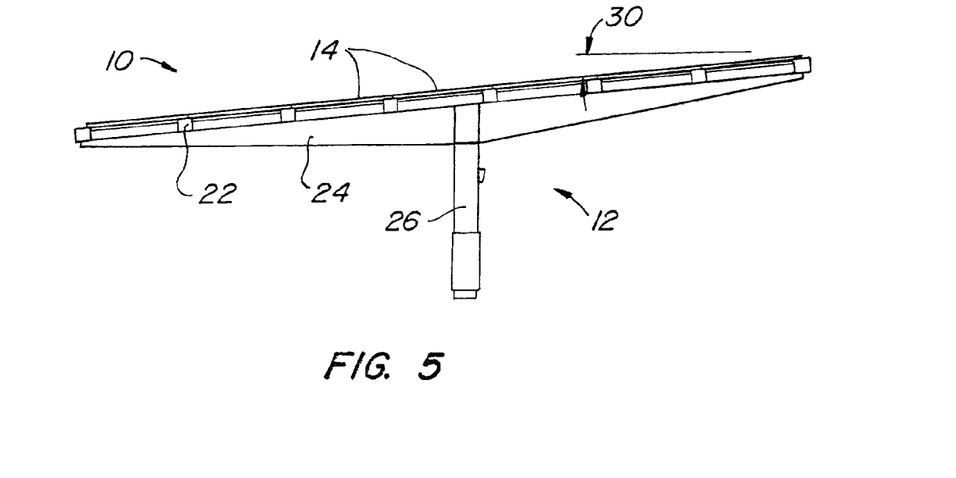
FIG. 5 is an enlarged end view of the shade system of FIG. 1 illustrating the 1:12 inclination of the modular panels.
Figures 6, 7:
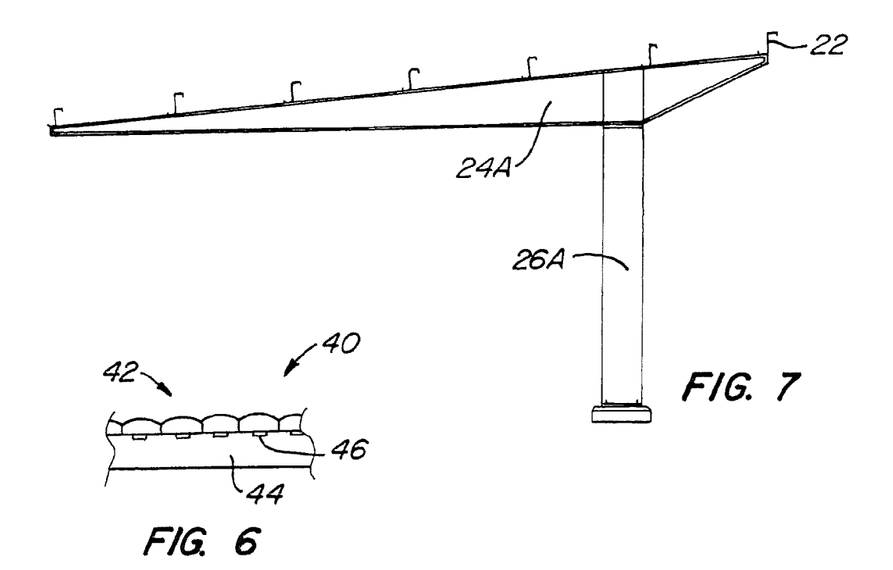
FIG. 6 is a simplified side view of a light concentrator type of PV panel.
FIGS. 7 and 8 illustrate alternative embodiments of the support structure of FIG. 5.
Figure 8:
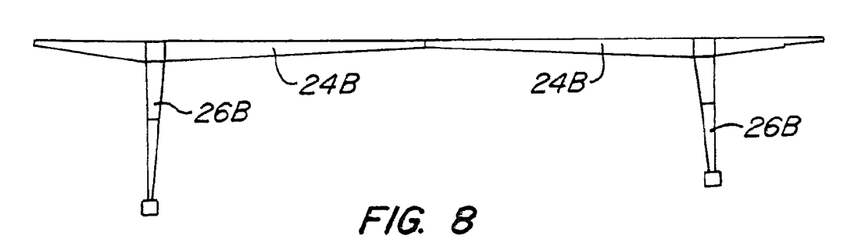
Figure 9:
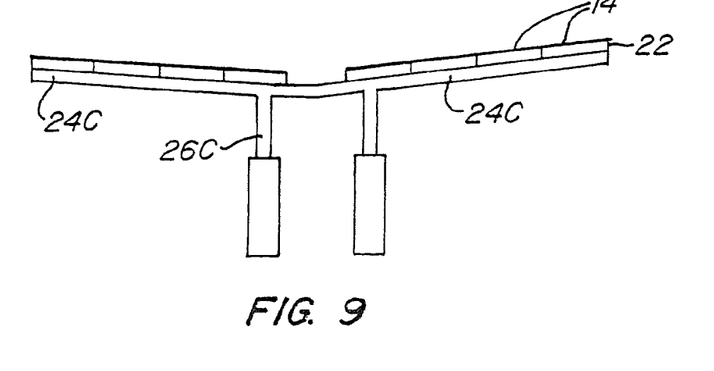
FIG. 9 illustrates an alternative embodiment of the shade system of FIG. 5.

FIG. 7 illustrates an alternative embodiment of the support structure illustrated in FIG. 5 in which beams 24A extend much farther to one side of column 26A than the other. FIG. 8 illustrates an embodiment in which beams 24B along one row are extended to meet the beams 24B along an adjacent row. The embodiment of FIG. 9 illustrates a further embodiment in which beams 24C of two adjacent rows are joined to one another with the beams angled in a manner so that modular panels 14 along both rows are angled downwardly towards the joined, central area of the rows.

Figure 4:
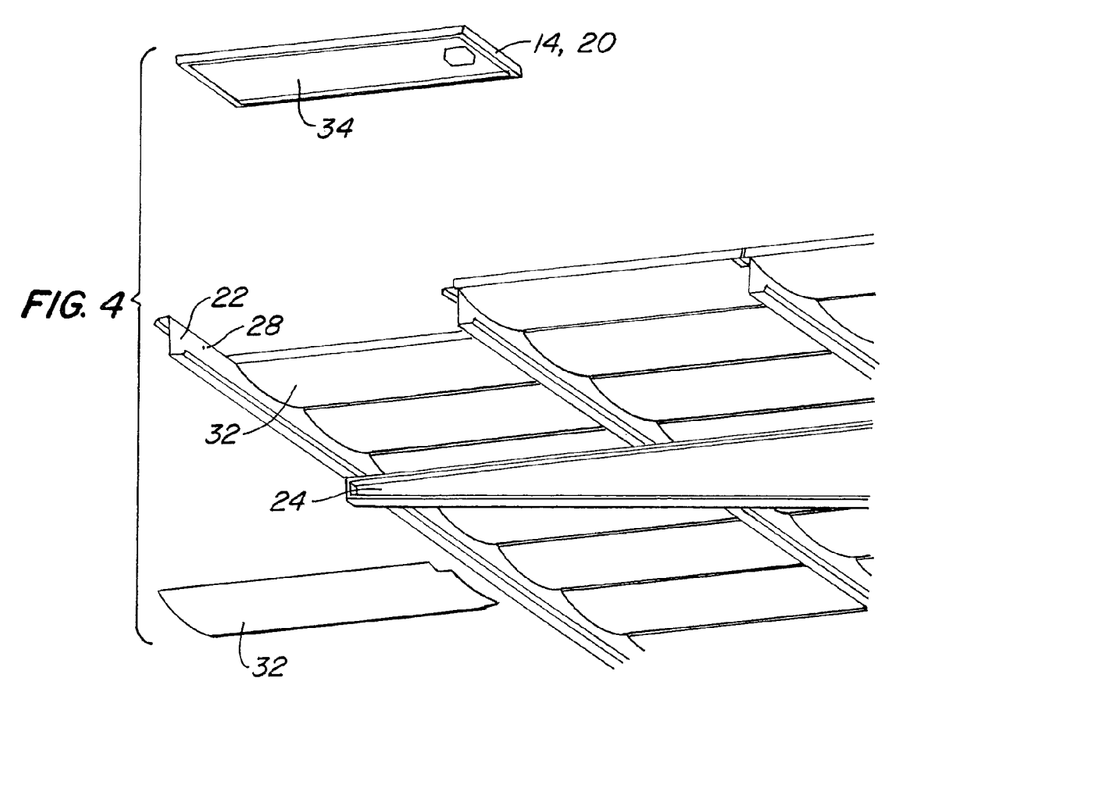
FIG. 4 is an enlarged bottom, front, left side isometric view of a portion of the shade system of FIG. 1 with the end caps removed to show the Z-cross-sectional shape of the purlins, and showing a modular panel and a protective panel spaced apart from the support structure.
Figures 10, 11, 12:
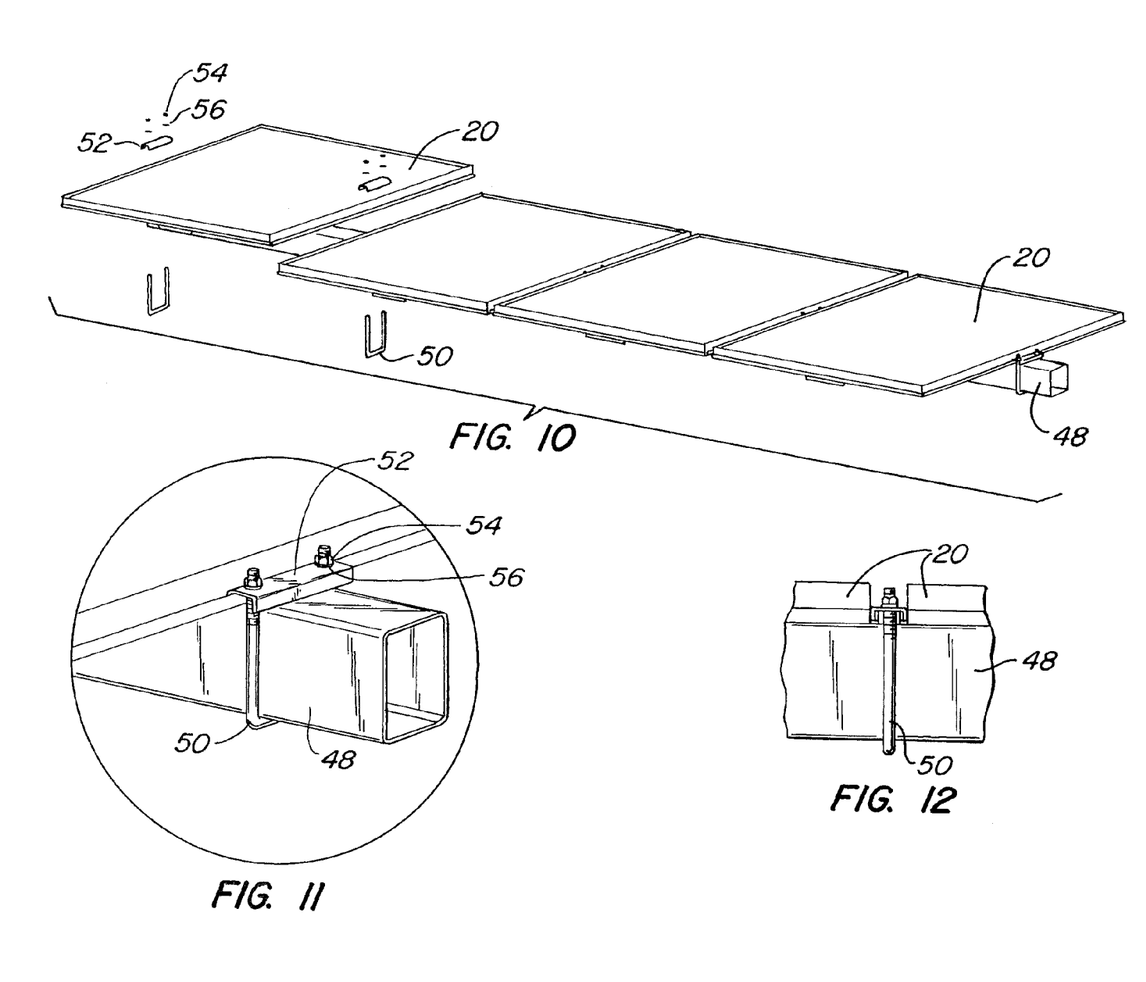
FIG. 10 is an overall view of alternative embodiment of the invention in which tubular purlins are used instead of the Z-shaped purlins of FIG. 4.
FIGS. 11 and 12 are enlarged views of portions of the embodiment of FIG. 10 illustrating the attachment of the PV panels to the purlins.

FIG. 10 illustrates a further embodiment in which the Z-shaped purlins 22, shown best in FIG. 4, are replaced by tubular purlins 48, in this case square tubular purlins. PV panels 20 are shown secured to tubular purlins 48 using U-bolts 50, U-channels 52, nuts 54 and washers 56. Tubular purlins 48 have several advantages. First, tubular purlins 48 may serve as wire conduit to contain the wiring. Second, tubular purlins 48 may serve as water conduit for fire protection. Third, tubular purlins 48 are not subject to lateral torsional buckling under load. As such they do not generally require lateral bracing, so the amount of structural material is reduced, the connection complexity is simplified, and the part count is reduced.

Figure 13:
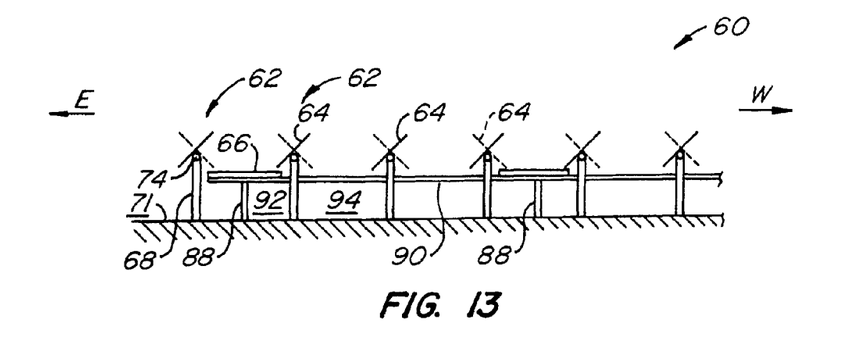
FIG. 13 is a simplified South-facing end view of a modular shade system with solar tracking panels made according to the invention.
Figure 14:
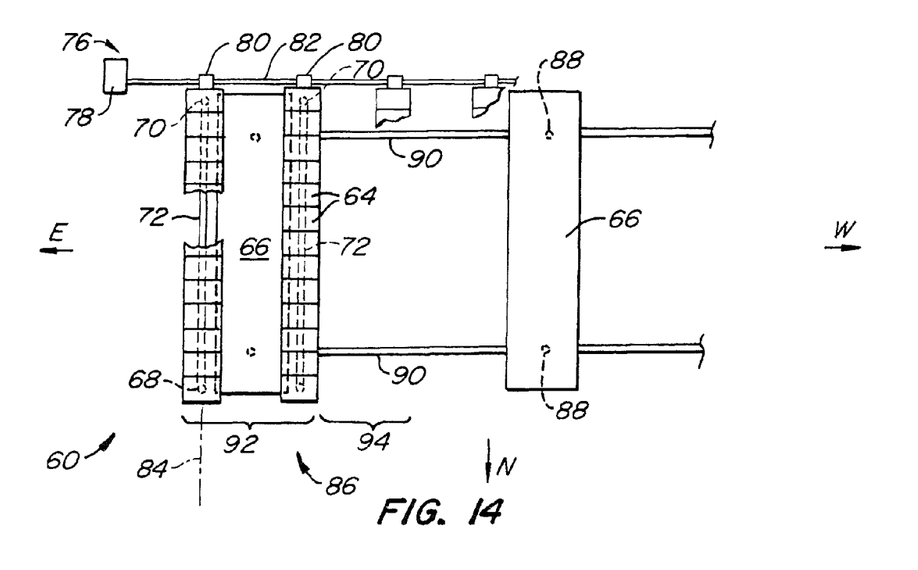
FIG. 14 is a simplified plan view of the system of FIG. 13 showing only some of the rows of panels for simplicity of illustration.
Figure 15:
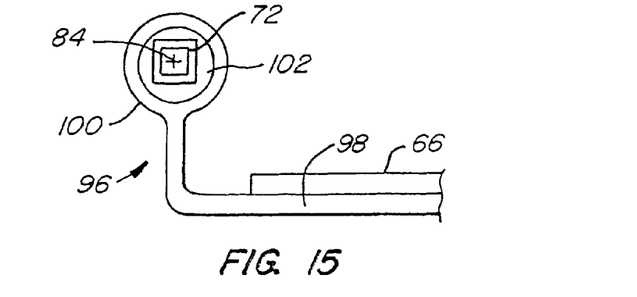
FIG. 15 shows an alternative embodiment of the shade structure mounting assembly of FIGS. 13 and 14.

FIGS. 13-15 illustrate a further embodiment of the invention. The modular shade system 60 incorporates rows 62 of tracking solar panels 64 and shade structures 66 located between at least some of rows 62. Each row 62 comprises a North Side support 68, a Southside support 70 and a torque tube 72 extending therebetween. Supports 68, 70 are supported by and extend upwardly from support surface 71. Support surface 71 is illustrated as the ground or earth but may be a different type of support surface, such as the roof of a parking structure or reservoir. Additional supports may be used between supports 68, 70. Torque tube 72 is mounted to supports 68, 70 by pivot connectors 74 to permit rows 62 of solar panels 64 to be pivoted between morning and evening orientations illustrated as the solid line of and dashed line orientations in FIG. 13. System 60 also includes a tilting assembly 76. Tilting assembly 76 includes a driver 78 and a drive element 80 associated with each row 62. Drive element 80 of rows 62 are coupled to one another by a drive element coupler 82. Driver 78 is connected to, in this embodiment, the drive element 80 at the end of the East-most row 62 so that actuation of driver 78 causes each drive element 82 to rotate its associated torque tube 72 about its torque tube axis 84 so that panels 64 for each row 62 pivot in unison. This type of solar tracking arrangement is shown in U.S. Pat. No. 6,050,930 and provisional patent application Nos. 60/455,649 and 60/530,384.

Modular shade system 60 also includes a shade assembly 86. Shade assembly 86 includes the shade structures 66, shade structure support posts 88 supported by and extending upwardly from support surface 71, and shade structure support bars 90 supported by posts 88. Support bars 90 extend in generally East-West directions beneath rows 62 of panels 64 and are used to support shade structures 66. Accordingly, in the example of FIGS. 14 and 15, shade structures 66 are stationary shade structures located at fixed positions between rows 62. The combination of shade structures 66 and the adjacent rows 62 of panels 64 create enhanced shade regions 92, which may be used for various purposes, including parking stalls. While shade structures 87 may be used between each row 62 of panels 64, the additional shading provided by such a configuration may not be needed or desirable. For example, one or more regions 94 between rows 62 of panels 64 may not be provided with shade structure 87 when regions 94 are to be used, for example, as traffic lanes or as strips for growing shrubs or trees or other plants. In the example of FIG. 13, counting from the left, first, second, third, fourth, fifth and sixth rows 62 of panels 64 are shown with shade structures 66 between the first and second rows and between the fourth and fifth rows. As shown in FIG. 14, the length, measured in the north-south direction, of the rows 62 of panels 64 is about equal to the length of shade structures 66, also measured in the north-south direction. In addition, in this example of FIGS. 13 and 14, the lengths extend generally parallel to one another and parallel to support surface 71.

An alternative to use of support bars 90 and support posts 88 is illustrated in FIG. 15. Shade structure hangars 96 are used to suspend shade structures 87 from torque tubes 72. Hangars 96 includes a generally horizontal central part 98 and a generally vertical arm 100 at either end of central part 98. Each arm 100 includes a bearing 102 which engages torque tube 72 and permits torque tube 72 pivot freely about its axis 84 while supporting hangars 96.

Modification and variation can be made to the disclosed embodiments without departing from the subject of the invention. For example, instead of rows 62 of solar panels 64, other types of panels, as discussed above, may also be used. One or more rows of stationery, non-tracking panels may be used with rows 62 of tracking panels 64. Shade structures 66 may comprise, for example, planted areas for living plants to a control water runoff. Torque tubes 72 may have circular, square or other regular or irregular cross-sectional shapes. While torque tubes 72 are preferably hollow, they may be solid or filled with a different material, such as structural foam.

Any and all patents, applications, and printed publications referred to above are incorporated by reference.

We claim:

1. A modular shade system with solar tracking panels for use on a support surface comprising:
   a series of generally North-South oriented, spaced apart rows of panels, each row of panels having a generally North-South oriented axis, at least some of the panels being solar collector panels;
   a stationary shade structure extending generally in a North-South direction and positioned at a fixed location between selected ones of the rows of panels and above the support surface so to provide an enhanced shaded region thereunder;
   a support structure comprising:
      a first mounting assembly mounting each row of panels above the support surface for rotation about the axis of each said row of panels; and
      a second mounting assembly supporting the stationary shade structure at the fixed location; and
   a tilting assembly selectively rotating each row of panels about its axis.

2. The system according to claim 1, wherein the rows of panels comprise elongate torque members along the generally North-South oriented axes.

3. The system according to claim 2, wherein the first mounting assembly comprises:
   pivot connectors;
   Southside supports pivotally connected to the torque members by the pivot connectors;
   Northside supports pivotally connected to the torque members by the pivot connectors; and
   the Southside supports and the Northside supports spaced apart from one another.

4. The system according to claim 3, wherein the Southside and Northside supports comprise vertical posts.

5. The system according to claim 1, wherein the second mounting assembly comprises East-West extending shade support bars and vertically extending posts supporting the East-West extending shade support bars.

6. The system according to claim 2, wherein the tilting assembly comprises a drive element associated with each torque tube, a drive element coupler operably coupling each drive element, and a driver drivingly coupled to at least one drive element or drive element coupler so to simultaneously rotate the torque tubes about their associated axes and simultaneously tilt the panels mounted to the torque tubes.

7. The system according to claim 1, wherein the solar collector panels comprise a light concentrator type of solar collector panel.

8. The system according to claim 1, wherein the solar collector panels comprise a light concentrator type of photovoltaic (PV) panel.

9. The system according to claim 1, wherein the panels are modular panels.

10. The system according to claim 9, wherein the modular panels comprise light-transmissive panels.

11. The system according to claim 10, wherein the light-transmissive panels are placed adjacent to one another.

12. The shading system according to claim 9, wherein the modular panels comprise PV panels and light-transmissive panels.

13. The system according to claim 1, wherein the panels comprise PV modules.

14. The system according to claim 13, further comprising protective panels mounted opposite, spaced apart from and covering substantially the entire lower surfaces of the PV modules.

15. The system according to claim 14, wherein the protective panels comprise at least one of sheet metal, perforated sheet metal, plastic, perforated plastic, cement board, perforated cement board, and phosphorescent material.

16. The system according to claim 14, wherein the PV modules and the protective panels are constructed to permit some light to pass therethrough.

17. The system according to claim 14, wherein the protective panels have a lower protective panel surface, at least substantially the entire lower protective panel surface being convex.

18. The system according to claim 14, wherein the protective panels are perforated.

19. The system according to claim 1, wherein the panels comprise phosphorescent modular panels to provide passive nighttime illumination beneath support structure.

20. A modular shade system with solar tracking panels comprising:

a support surface;

a series of generally North-South oriented, spaced apart rows of panels, each row of panels having a generally North-South oriented axis, at least some of the panels being solar collector panels;

a stationary shade structure extending generally in a North-South direction and positioned at a fixed location between selected ones of the rows of panels and above the support surface so to provide an enhanced shaded region thereunder;

a support structure comprising:

a first mounting assembly mounting each row of panels above the support surface for rotation about the axis of each said row of panels; and a second mounting assembly supporting the stationary shade structure at the fixed location; and a tilting assembly selectively rotating each row of panels about its axis.

21. The system according to claim 20, wherein the support surface comprises a chosen one of the ground and a roof.

22. The system according to claim 20, wherein the support surface comprises a vehicular parking area having parking stalls at the enhanced shaded region and traffic regions adjacent to the parking stalls.

23. The system according to claim 20, further comprising:

first, second, third, fourth and fifth of said rows of panels, and first and second of said stationary shade structures located between the first and second rows of panels and between the fourth and fifth rows of panels, respectively.

24. The system according to claim 23, wherein said rows of panels have row lengths and said stationary shade structures have structure lengths, said row lengths being about equal to the structure lengths, said row lengths and structural lengths extending parallel to one another and parallel to the support surface.

* * * * *